Patented May 13, 1952

2,596,690

UNITED STATES PATENT OFFICE 2,596,690

PREPARATION OF BORON COMPOUNDS

Dallas T. Hurd, Schenectady, N. Y., assignor to General Electric Company, a corporation of New York No Drawing. Application October 22, 1945, Serial No. 623,859

3 Claims. (Cl. 23—204)

This invention relates to new and improved methods for the preparation of boron compounds. More particularly the invention is concerned with the method of preparing boron compounds, specifically boron hydrides (hydroborons), which comprises effecting reaction between ingredients including a boron halide, specifically boron chloride, bromide, fluoride or iodide, and a hydride selected from the class consisting of hydrides of the alkali and alkaline-earth metals, that is, lithium, sodium, potassium, rubidium, caesium, calcium, strontium and barium hydrides. If desired, mixtures of metal hydrides of the defined class may be employed instead of a single hydride. The scope of the invention also includes the method of preparing boron compounds, more particularly boron hydrides, which comprises bringing into contact at reaction temperature (1) a boron halide, (2) hydrogen and (3) a hydride of the above-mentioned class or mixtures thereof.

One of the methods heretofore known for preparing boron hydrides, which also may be designated as boranes, involved the reduction of a specially prepared magnesium boride in acid solution to give quite low (about 3%) yields of tetraborane (dihydrotetraborane), $B_4H_{10}$ [see A. Stock and C. Massenez, Berichte, 45, 3529 (1912)]. Another method, described by H. I. Schlesinger and A. Burg in J. Am. Chem. Soc., 53, 4321 (1931), consisted in the reduction of boron chloride (trichloride) or bromide (tribromide) with excess hydrogen in the electric arc or glow discharge, and yielded under optimum conditions about 25% conversion of the boron halide per pass through the reaction chamber to the volatile boron hydride, diborane ($B_2H_6$), part of which appeared in combination with halogen as the unstable diborane monohalide ($B_2H_5X$).

In my copending application Serial No. 623,858 (now Patent 2,469,879), filed concurrently herewith and assigned to the same assignee as the present invention, I disclosed and claimed a method of preparing boron compounds, specifically boron hydrides, which comprises effecting reaction between a boron halide and hydrogen while the said reactants are in contact with a mass containing an electropositive metal selected from the class consisting of the alkali metals, the alkaline-earth metals, magnesium, zinc and aluminum. By that method yields of boron hydrides estimated from the distillation data as representing a conversion of as much as 50% boron halide to volatile boron hydride per pass through the reaction chamber have been obtained by causing the vapors of a boron halide admixed with hydrogen to contact a mass containing as an essential component an electro-positive metal of the aforementioned class, the said mass being heated to the temperature of reaction between the aforesaid boron halide and hydrogen, e. g., to a temperature within the range of about 200° to 400° C. As stated in that application, instead of using a metal of the defined class (or mixtures thereof) in free state, it may be used in the form of an alloy with another metal which also may be a member of the same class, e. g., an alloy of aluminum and magnesium, or of a different class, e. g., an alloy of aluminum and nickel.

The present invention is based on my discovery that higher yields of boron hydrides (based on the amount of boron halide used as a starting reactant) than heretofore have been known to the art also may be obtained by practicing the method described briefly in the first paragraph of this specification and more fully hereafter. Furthermore, by practicing the present invention, the desired reaction (using the same boron halide and a hydride of the same alkali or alkaline-earth metal) may be effected at a somewhat lower minimum temperature (e. g., 150°–180° C., depending, for example, upon the particular reactants employed) than the minimum temperature at which the method defined by the claims of my aforementioned copending application Serial No. 623,858 (now Patent 2,469,879) can be practiced. Higher temperatures of reaction, e. g., temperatures as high as about 400° C., may be employed, but in general the reaction temperature should not be so high as to cause decomposition of the boron hydrides as they are formed and the deposition of excessive amounts of metallic boron within the reaction zone. In brief, the reaction temperature may vary within a fairly wide range depending, for instance, upon the particular boron halide and alkali or alkaline-earth metal hydride used, whether or not the boron halide is admixed with hydrogen or other gas, e. g., an inert gas such, for instance, as nitrogen, as it contacts the hydride, and other influencing factors, but ordinarily will be within the range of about 150° to about 400° C.

The reaction products obtained by practicing the method of this invention, like those resulting from the method disclosed and claimed in the aforementioned copending application Serial No. 623,858 (now Patent 2,469,879), include diborane, and also may include diborane monohalide (an unstable product) and hydroborons having a higher boiling point (higher molecular weight) than diborane. The higher boiling boron compounds may include (depending, for example, upon the particular reaction conditions) hydroborons such, for instance, as tetraborane ($B_4H_{10}$), pentaborane ($B_5H_9$), hexaborane ($B_6H_{10}$) and decaborane ($B_{10}H_{14}$). A by-product of the reaction is a halide of the metal of the hydride employed, the halogen of the boron halide combining with the metal of the hydride to form the metallic salt thereof while the hydrogen of the hydride (together with hydrogen that may have been admixed with the boron halide) is combining with the boron to form boron hydrides. The boron hydrides are separated from the other products of the reaction by any suitable means, e. g., by fractional distillation.

The metal hydride of the class used in practicing this invention may be the sole component of the mass with which the boron halide (or mixture of boron halide and hydrogen [a diluent reactive gas] or a diluent inert gas, e. g., nitrogen) is brought in contact at reaction temperature. Or, the contact mass may contain the metal hydride (or mixtures thereof) together with other ingredients which may catalyze or otherwise facilitate the reaction. For example, the reaction between the boron halide and metal hydride, in the presence or absence of added hydrogen or of a gas which is inert under the reaction conditions, e. g., nitrogen, may be effected while the hydride of the defined class is admixed with an electropositive metal of the kind set forth in my aforementioned copending application Serial No. 623,858 now Patent 2,469,879, namely, one selected from the class consisting of the alkali metals (lithium, sodium, etc.), the alkaline-earth metals (calcium, strontium and barium), magnesium, zinc and aluminum.

In order that those skilled in the art better may understand how the present invention may be carried into effect, the following examples are given by way of illustration and not by way of limitation.

Example 1

Boron fluoride gas and hydrogen gas in about 1:2 ratio by volume were passed in a continuous stream through a heated charge of granular sodium hydride. A reaction ensued at about 180° C., at which temperature boron fluoride was no longer present in the effluent gas. An analysis of the effluent gas revealed diborane in considerable amount, together with excess hydrogen. Sodium fluoride formed by the reaction remained in the charge. No unconverted boron fluoride appeared in the effluent gas during the course of the reaction. It was apparent, therefore, that a very high conversion of boron fluoride to boron hydrides was obtained by this process.

By condensing the effluent gases at a low temperature, e. g., at a temperature of the order of −190° C., a condensate is obtained from which the boron hydrides produced by the reaction may be separated from any other components of the condensate by fractional distillation.

Example 2

A continuous stream of the vapor of boron chloride and hydrogen gas in about 1:3 ratio by volume were passed through a charge of granular calcium hydride heated to 325° C. An exothermic reaction ensued with the formation of gaseous boron hydrides. The effluent gas became spontaneously inflammable due to the presence of the unstable diborane monochloride, $B_2H_5Cl$.

Example 3

The vapor of boron bromide and hydrogen gas in about 1:2 volume ratio were passed in continuous flow over granular sodium hydride heated to 350° C. A reaction ensued with the formation of sodium bromide as a by-product. The effluent gas was found by analysis to contain boron hydrides.

The boron hydrides are separated from the other products of the reaction by condensing the gaseous products of the reaction as described under Example 1, and fractionally distilling the condensate.

Example 4

The vapor of boron chloride and hydrogen in about 1:1 ratio by volume were passed continuously over heated granular sodium hydride. At about 200°–220° C. a reaction began, sodium chloride was formed in the charge, and the presence of boron hydrides in the effluent gas was confirmed by analysis.

The boron hydrides are separated from the condensed effluent gas by fractional distillation.

Example 5

Boron chloride vapor admixed with nitrogen gas (as a diluent) in about 1:3 ratio by volume was passed over granular sodium hydride heated to 250° C. A reaction ensued with the formation of sodium chloride, and the presence of boron hydrides in the effluent gas was confirmed by specific chemical tests for these compounds.

The gaseous products of the reaction are condensed, e. g., at −190° C., and the boron hydrides present in the condensate are separated by fractional distillation.

It will be understood, of course, by those skilled in the art that my invention is not limited to the specific boron halides and to the specific metal hydrides named in the above illustrative examples. Thus, boron iodide also may be employed. Or, instead of using a single boron halide, I may use a mixture of boron halides. Also, instead of sodium hydride or calcium hydride, other hydrides of the alkali metals or of the alkaline-earth metals may be employed, examples of which were given hereinbefore. Likewise, the invention is not limited to the specific temperature or temperature ranges mentioned in the examples. The conditions of reaction will vary depending, for example, upon the particular reactants employed and the particular end products desired to be obtained. In general, the vapor-phase reactions are preferred because they can be carried out more economically and controlled more easily.

The proportions of boron halide and metal hydride to each other may be varied considerably, as desired or as conditions may require. The boron halide and metal hydride may be used in approximately stoichiometric amounts if desired. Ordinarily, however, an excess of hydride is employed over the stoichiometric amount required for reaction with the boron halide. If hydrogen is admixed with the boron halide as it contacts the metal hydride, it may be present in any amount ranging, for example, from a trace to a large excess, for instance 10 or more volumes of hydrogen gas per volume of boron halide vapor.

The reaction between a metal hydride of the class used in practicing my invention and a boron halide is exothermic, and at times may be difficult to control unless special precautions are taken. I have found that admixture of the boron halide vapor (by which wording is included gaseous boron fluoride) with hydrogen gas or with an inert, diluent gas, e. g., nitrogen, argon, helium, etc., provides better control of the reaction temperature and thus minimizes or eliminates completely the deposition, in the reaction zone, of elementary boron resulting from pyrolysis of the hydroboron reaction products.

From the foregoing description it will be seen that the present invention provides a new and improved method of preparing boron compounds, more particularly boron hydrides and diborane monohalide. A specific method feature of the invention is the method of preparing boron compounds, specifically boron hydrides, which comprises causing the vapors of a boron halide, e. g., boron chloride, boron fluoride, etc., alone or admixed with hydrogen, or admixed with an inert gas, e. g., nitrogen, krypton, etc., to contact a mass containing a hydride of an alkali or alkaline-earth metal, e. g., sodium hydride, calcium hydride, etc., which mass is heated to the temperature of the reaction between the aforesaid ingredients. Another method feature of the invention is the method of preparing boron hydrides which comprises effecting reaction, e. g., at a temperature within the range of about 150° to about 400° C. between ingredients including a boron halide and a hydride of an alkali or alkaline-earth metal, and separating (e. g., by fractional distillation) the boron hydrides that are formed from the other products of the reaction.

What I claim as new and desire to secure by Letters Patent of the United States is:

1. The method of preparing boron hydrides which comprises effecting reaction at a temperature within the range of about 150° to about 400° C. between a boron halide, hydrogen and an alkaline-earth metal and separating the boron hydrides that are formed from the other products of the reaction.

2. The method of preparing boron hydrides which comprises effecting reaction at a temperature within the range of about 150° to about 400° C. between boron chloride, hydrogen and calcium hydride and separating the boron hydrides that are formed from the other products of the reaction.

3. The method of preparing boron hydrides which comprises effecting reaction at a temperature within the range of about 150° to about 400° C. between boron fluoride, hydrogen and calcium hydride and separating the boron hydrides that are formed from the other products of the reaction.

DALLAS T. HURD.

No references cited.

UNITED STATES PATENT OFFICE

CERTIFICATE OF CORRECTION

Patent No. 2,596,690

May 13, 1952

Dallas T. Hurd

It is hereby certified that error appears in the printed specification of the above numbered patent requiring correction and that the said Letters Patent should read as corrected below.

Column 6, line 11, after "metal" insert -- hydride --.

Signed and sealed this 8th day of July 1958.

(SEAL)
Attest:
KARL H. AXLINE
Attesting Officer

ROBERT C. WATSON
Commissioner of Patents